June 17, 1930.  P. P. DEAN  1,764,936
CONTROL MEANS FOR POWER OPERATED MECHANISMS
Filed June 25, 1927  3 Sheets-Sheet 1

Inventor
PETER PAYNE DEAN
By his Attorney

June 17, 1930.  P. P. DEAN  1,764,936
CONTROL MEANS FOR POWER OPERATED MECHANISMS
Filed June 25, 1927   3 Sheets-Sheet 3

Inventor
PETER PAYNE DEAN
By his Attorney

Patented June 17, 1930

1,764,936

UNITED STATES PATENT OFFICE

PETER PAYNE DEAN, OF NEW CANAAN, CONNECTICUT, ASSIGNOR TO THE LIMITORQUE CORPORATION, A CORPORATION OF NEW YORK

CONTROL MEANS FOR POWER-OPERATED MECHANISMS

Application filed June 25, 1927. Serial No. 201,308.

The invention relates to control apparatus, more particularly for use in connection with the starting and stopping of mechanism of various kinds, for example, power devices for operating valves and the like. In the operation of opening and closing of a valve inserted in a conduit for conveying fluid a gate or a disk member is generally employed to cut off the flow, the movement of the same for the larger types of valves being effected by a suitable power device; and provision is made to interrupt the applied power at certain predetermined points in the travel of the flow controlling element. Electrical limit switches geared to a valve stem or the like are generally employed for this purpose; but the difficulty inherent in this type of equipment resides in the fact that the same involves a definite ratio of the travel of the limit switch to the gate movement, resulting frequently in jamming of the gate in that the travel of the latter is not a constant quantity. In other words, a gate or like member may not always stop at the same point at each operation due to accumulation of material on the valve seat or because of other sources of obstruction. In such instances, the full power of the driving motor will be applied to the gate or the like as the limit interrupting means will not have become effective. Serious overload on the motor may, also, occur as a result of a valve sticking or jamming as from a bent stem or broken part. The said motor, however, continues to apply its full force thereto which results frequently in breakage of one or more of the operating parts.

Expedients such as a safety clutch have been included in the transmission between a motor and the valve stem to allow of slippage in an attempt to protect the valve parts; but since no provision is made for stopping the motor under these conditions, the same continues to operate under excessive load and until it burns out.

Moreover, while the appliction of a definite amount of power is necessary under normal operating conditions to open or close the valve, emergency conditions may arise in which additional power is required for effecting the closure of the same, as in the case of an excesseive velocity of the fluid due, for example, to ι break in the line. With the usual type of control mechanism, the same is designed to have always available the maximum power to provide against all contingencies.

It is one of the objects of the present invention to provide control means for power operated mechanism of the aforesaid type which will function to apply only the actual power necessary for operating under ordinary working conditions but with which provision is made to render available excess power suitable for operation under emergency conditions. By this expedient, the necessary minimum only is normally applied and the various parts thus protected against jamming or excessive mechanical friction, while the maximum power is nevertheless available under emergency conditions.

The invention has for its object, also, the provision of novel means for limiting the power in the opening and closing of a valve or the like under normal operating conditions and to the adjustment of the degree of power to be applied, as well as to means of applying the maximum power of the motor in case of emergency closing.

A further object of the invention resides in the means for stopping the travel of a gate or disk member actuated by the motor device at a predetermined point, depending upon the load thereon or resistance to its movement and caused by friction.

A still further object of the invention resides in the provision of shock absorbing means for reducing the stress on the operating parts in the closing or opening under maximum power, said arrangement contemplating allowing the driving motor to attain substantially its full speed before its power is applied to the valve stem for the closing or opening of a valve.

The invention contemplates, also, the arrangement whereby the limit switches employed are caused to remain when under load in the particular position set.

The novel control mechanism is readily adaptable to existing valve structures, whether of the rising or non-rising stem variety, and at comparatively low expense.

To this end, and in attaining the foregoing novel features, the invention contemplates a worm and a worm wheel connection between the driving motor and the valve stem or like member, the worm of said transmission being axially movable in opposition to a pair of spring loading members positioned on opposite sides thereof and the said axial movement of the worm being employed to actuate a contact making and breaking member.

It is to be understood, however, that while the invention is herein shown and described as applied to the control of a motor device for operating valves and the like, the same is applicable to other mechanisms driven by power, whether by air, steam or electricity, wherein the degree of power to be absorbed may be predetermined and the operation caused to cease at the application of such predetermined power.

The nature of the invention, however, will best be understood when described in connection with the accompanying drawings, in which.

Figure 1:
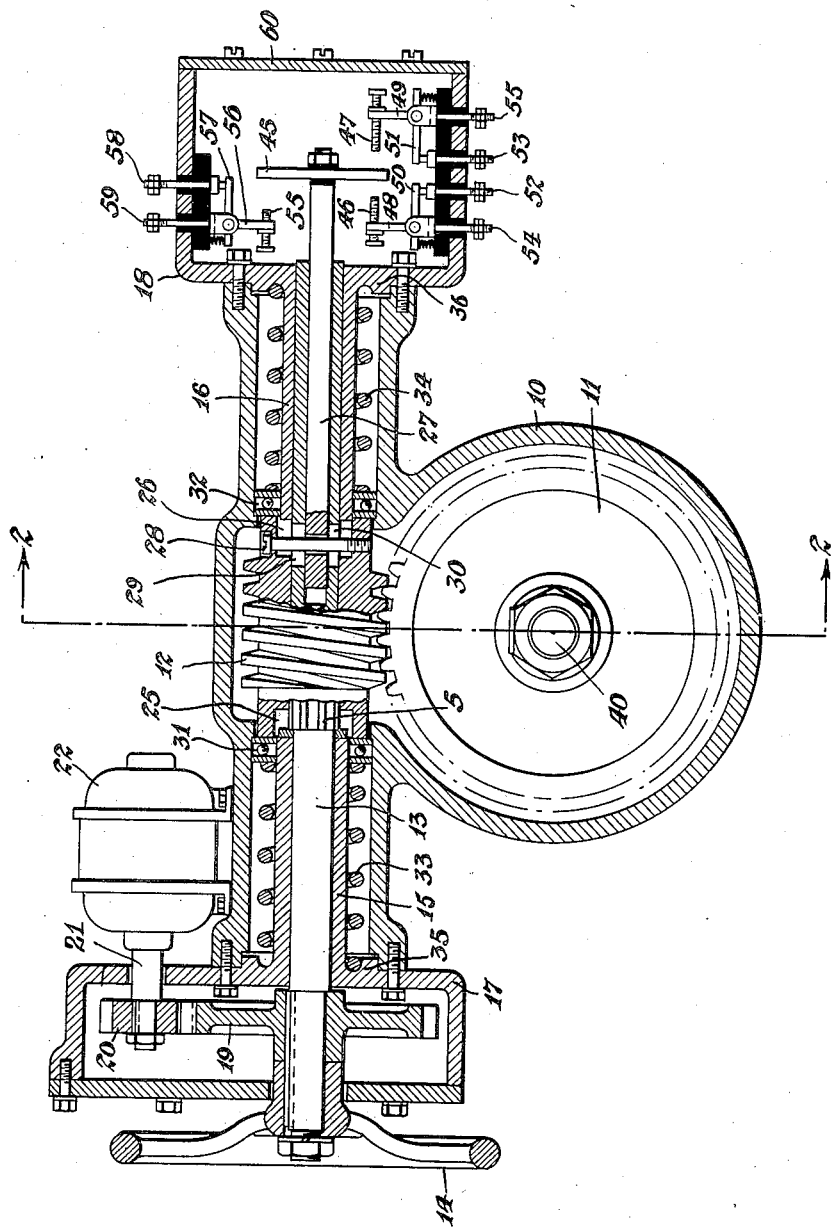
Fig. 1 is a longitudinal section through the novel control means.

Referring to the drawings, 10 designates a suitable casing or housing in which is mounted for rotation a worm wheel 11, the same being in mesh with a worm 12 carried by a shaft 13. The said worm is mounted on the shaft intermediate its ends in manner to have a limited sliding motion thereon, as by being splined thereto, as shown. The outer end of shaft 13 immediately beyond the splined portion is somewhat reduced in diameter to assist in axially fixing the shaft in position and has secured at its extreme outer portion a hand wheel 14 for manually rotating said shaft. The latter is mounted for rotation in suitable bearing members 15 and 16 at the respective outer and inner ends thereof and which extend inwardly from end casing members or housings 17 and 18 respectively and bolted to the housing 10.

Within the housing 17 and also secured to the outer end of shaft 13 is a gear wheel 19 meshing with a pinion 20 on the shaft 21 of an electric motor 22 carried by the housing. In this manner, the said shaft 13 may also be power driven in addition to its manual operation through the hand wheel 14.

Worm 12 is counterbored at its opposite ends to provide respective cylindrical openings 25 and 26 of sufficient diameter to slide freely over the respective bearings 15 and 16, while the inner end of shaft 13 is axially bored substantially to the middle portion of the worm-holding part thereof and is designed to receive therethrough a rod 27 which is pinned at its inner end to the worm by means of a transversely disposed pin 28. The splined portion of shaft 13 is, furthermore, slotted as at 29 and 30 to permit the said pin to pass therethrough and allow of movement of said pin with rod axially with respect to the shaft.

The annular end faces of the worm resulting from the counterboring thereof are arranged to abut ball thrust bearings 31 and 32 movable on the corresponding bearing portions 15 and 16 and about which are mounted compression helical springs 33 and 34 respectively and of predetermined compressive force. One end of these springs bears against a corresponding thrust bearing and the other end is seated in a flange 35 and 36 respectively of the corresponding bearing. The degree of resisting force of the two said springs is determined in accordance with the desired movement of rod 27; and the length of the springs may be suitably regulated before useful movement thereof will occur. The spring pressures exerted are substantially equal so that normally the worm 12 will be maintained in its central position when the load on the worm teeth is removed, substantially as shown in Fig. 1 of the drawings.

When power is applied, however, for rotating the shaft 13, either through motor 22 or hand wheel 14, the said worm will first tend to slide in the corresponding direction along shaft 13 due to the thrust exerted thereby, as the resistance offered by worm wheel 11 would exceed the initial resistance of, for example, the spring member 34; and not until the resistance offered by said spring equals or exceeds the frictional load on the worm wheel 11 will the latter be actuated.

Figure 2:
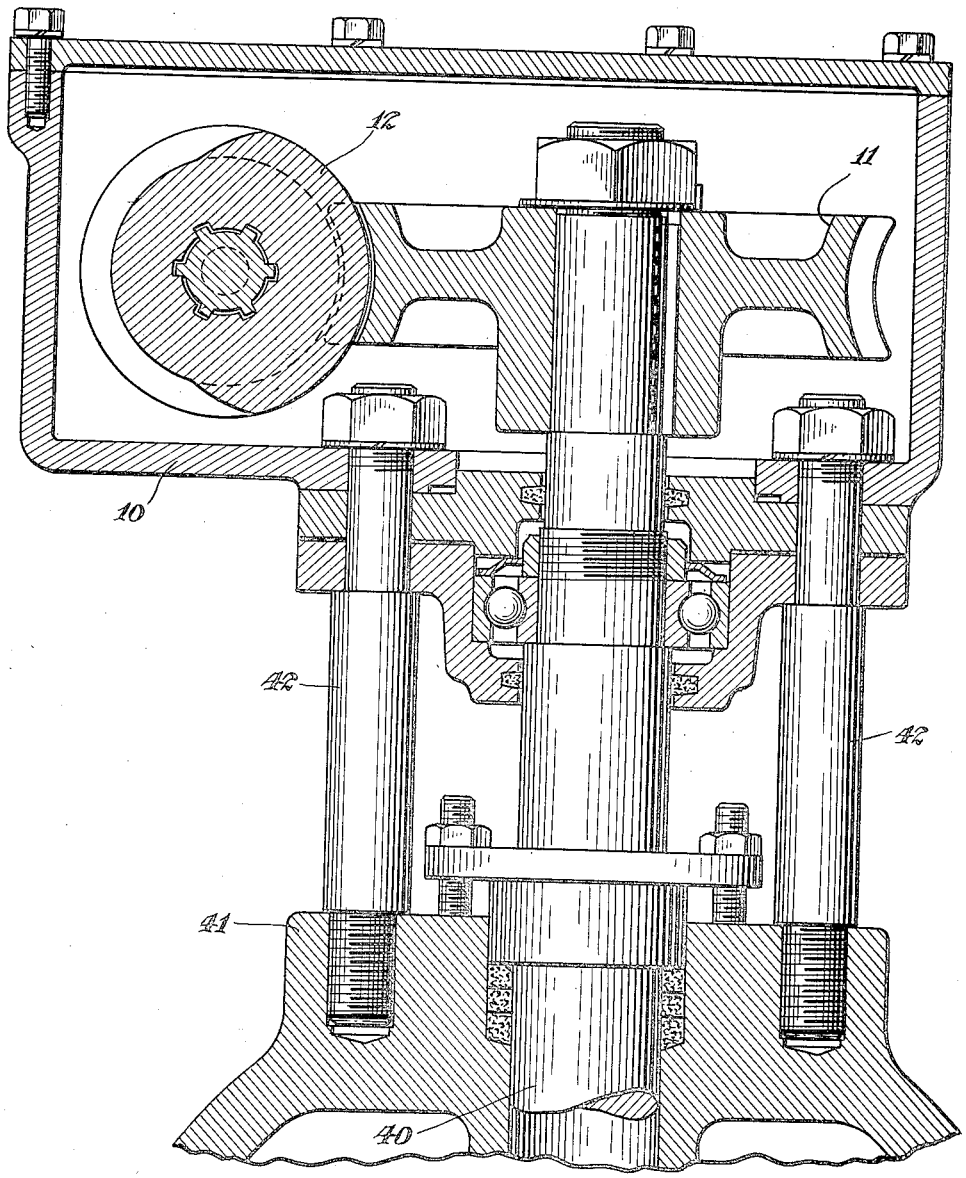
Fig. 2 is a fragmentary enlarged vertical section therethrough taken on the line 2—2, Fig. 1 of the drawings, and looking in the direction of the arrows.

As indicated in Fig. 2 of the drawings, the said worm wheel is mounted upon the outer end of a shaft or stem 40 which may be the valve stem of a suitable valve of the non-rising type (not shown), said stem being rotatably mounted on the top of the casing 41 for the valve. It will be thus seen that the control mechanism may conveniently be secured to a valve stem as, for example, by means of bolts 42 which secure the casing 10 thereof to the valve casing.

In the novel combination of the worm wheel drive, the spring members and the axially movable worm the initial shock of starting or stopping is taken up and absorbed by the said spring members; and, furthermore, the longitudinal, or rather, axial movement of the said worm may be utilized to interrupt or to apply the supply of power to the motor or like device for rotating the said shaft.

This is accomplished as a result of the movement imparted to rod 27 from the movement of worm 12 through the pin 28 connecting the same. The said rod to this end carries at its outer end a suitable disk 45 which may be of metal suitably insulated therefrom and is designed to engage with a contact screw 46 on one side or a contact screw 47 on the other side thereof. These said screws are adjustably secured in the correspondingly upwardly projecting arms 48 and 49 of a bell crank whose other arms 50 and 51 respectively rest normally upon electrical contacts 52 and 53 respectively to bridge a circuit passing through the respective bell cranks from terminals or posts 54 and 55 and the said contacts 52 and 53. Normally the disk is positioned substantially midway between the contact screws 46 and 47; and when it is moved toward one or the other to engage the same will correspondingly rock its bell crank to lift the arm from the corresponding contact and thus interrupt the circuit at this point.

In connection with one of the contacts, as the contact 46, there is provided an additional contact-making member including an adjustable contact screw 55 which is mounted on arm 56 of a bell crank whose other arm 57 is designed to close a circuit at the contact 58 and passing through the terminal 59 and the said bell crank. The foregoing contact elements are suitably mounted within the housing 18 which is provided with a removable cover 60 so that access thereto may be had for setting the adjustable contact controlling screws as may be desired.

Figure 3:
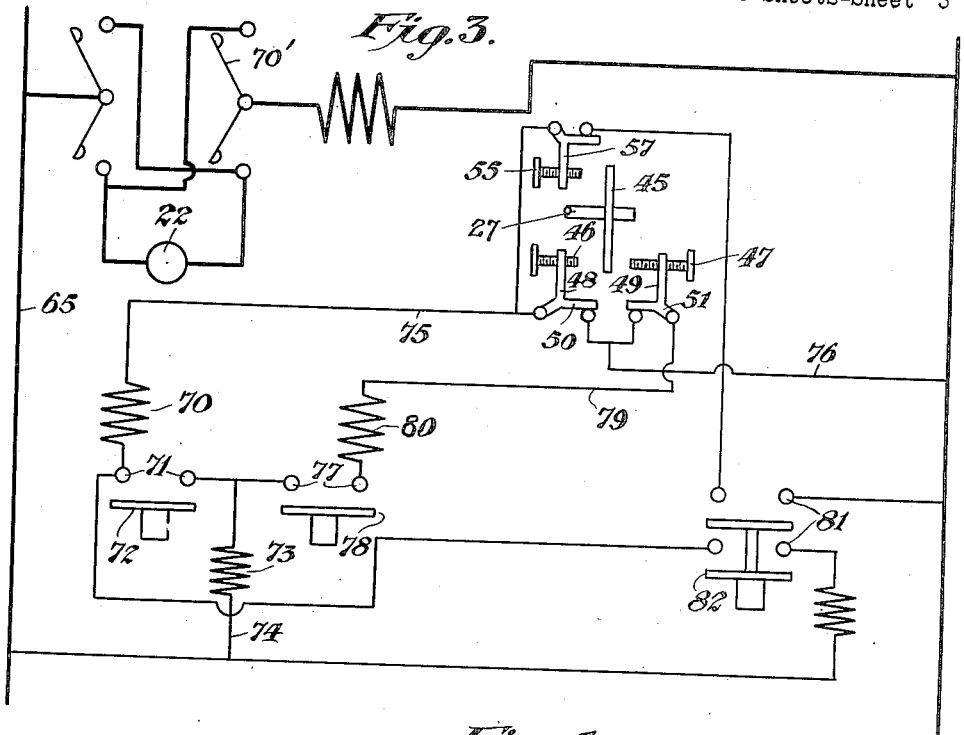
Fig. 3 is a diagrammatic view of the electrical connections involved in carrying out the invention with an electric motor as the driving power element.
Figure 4:
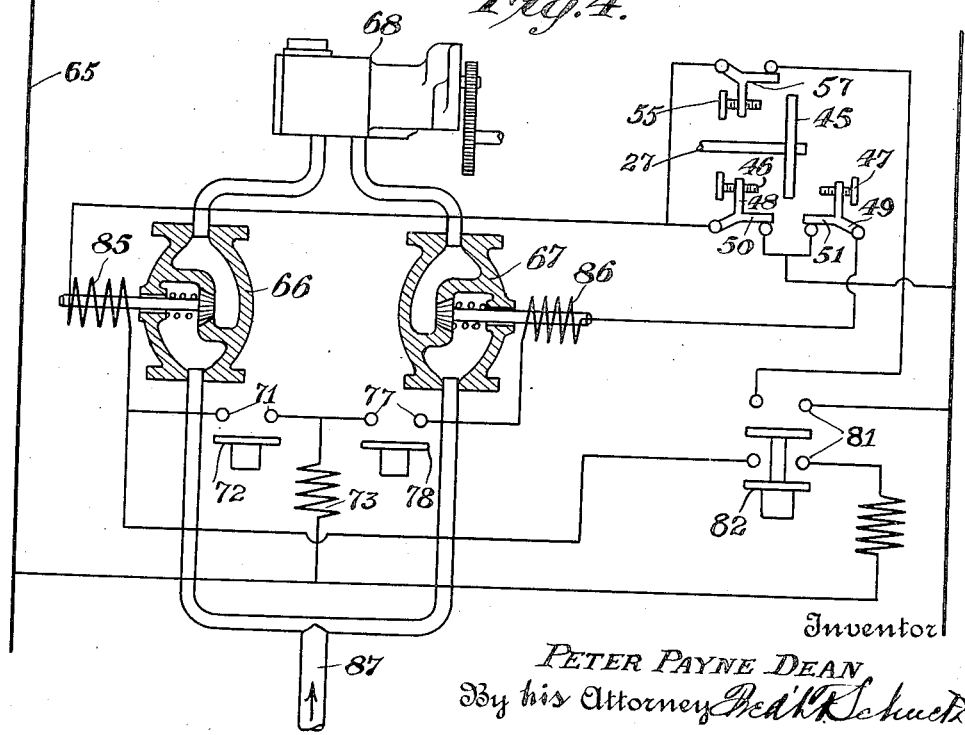
Fig. 4 is a similar view with the electric power element replaced by an air or steam actuated element.

The electrical circuits involved in the particular operations set forth are more clearly shown in Figs. 3 and 4 of the drawings and in which 65 designates a power main for supplying electrical energy to the motor 22, Figs. 1 and 3; or, merely for electro-magnetically controlling valves 66 and 67, Fig. 4 of the drawings, which valves in turn control a prime mover 68 such as an air, steam or hydraulic motor as a substitute for the electric motor shown in Figs. 1 and 3.

In the former embodiment, the magnet coil 70, which may be of the usual contractor motor starter type for actuating the motor starter switch 70', may be energized by closing the circuit at the contacts 71 through push-button or switch member 72 and manually operable, the current flowing also through a no-voltage release coil 73 to maintain the connection so long as the current is flowing. When the contacts 71 are thus bridged, the circuit is through the lead 74 from one side of the main 65, coil 70, lead 75, to the bridging contact 50 and through lead 76 to the other side of the main closing the circuit. The aforesaid circuit is maintained in this condition until the circuit is opened by the lifting of arm 50 through engagement of the disk 45 with its contact screw 46. Similarly, a further set of contacts 77 may be bridged through the operation of a push-button 78 to close a circuit through lead 74, no-voltage release coil 73, contacts 77, coil 80, lead 79 to the contact closed by arm 51 and lead 76. This circuit will operate the contactor 80 for the starter switch to reverse the motor, and will be maintained until the bell crank is rocked to lift arm 51 through engagement of the disk 45 with the contact screw 47 during the forward stroke of rod 27.

The contact arm 57 is arranged to provide normally a shunt across the contact arm 50 and which may be closed at a double contact switch 81 operated by a push-button or switch 82 so that even should the circuit be opened at 50 it still could be maintained by operating the said push-button 82. The latter button is for emergency use only and is designed to provide for additional power on the valve stem through adjustment of the contact screw 55 to allow for more movement of the disk 45 in case the valve thereof is required to close against excessive velocity of the fluid passing therethrough which may result from a break in an outside pipe. It will be understood that when the contact is broken or interrupted at either arm 50 or arm 51 that the power will normally be cut off from the actuating motor; and in order to restore the same for reverse direction of operation, it will be necessary to close the circuit at another push-button or circuit closing means for the other of the contact arms.

In starting the mechanism for closing the valve, the push-button 72 will be manually actuated to bridge the contacts 71 and will be held, for example, by the usual mechanical latch (not shown) actuated by the latch coil 73 (no-voltage release coil), the motor then operating as aforesaid until the circuit is interrupted at the arm 50. Thereupon, if it be desired to open the valve again, it will be necessary to bridge the contacts 77 by manually actuating the circuit closing member 78. Should additional power be required in the closing of the valve, as against excessive velocity of the fluid passing therethrough, the circuit closing member 82 will be actuated to bridge the double contacts 81 and thereby shunt the circuit closing arm 50 so that the motor will be continued in operation for a further period and until the contact is broken at the arm 57 through engagement of disk 45 with the contact screw 55.

Under normal operating conditions, the contact screw 46 is set so as to open the circuit upon a predetermined torque being applied to the valve stem, and which represents the normal load thereon. In order to increase the torque available, as is necessary under emergency conditions, the contact screw 55 is set to interrupt the circuit at the desired travel of the disk 45; and, similarly, contact screw 47 is adjusted to the desired position for opening the valve.

Moreover, the travel of disk 45 is regulated by the degree of compressive force of the springs 33 and 34 and which bears a direct ratio to the torque applied to the shaft 13. In this manner, the various contacts may be adjusted to open the corresponding circuits after any desired predetermined power has been applied.

In determining the proper position at which to set the contact screws, the control mechanism may be operated manually for positioning the valve, as through the hand wheel 14, said valve being closed to a predetermined point or position wherein it is sufficiently tight. By this operation, the worm 12 will be moved longitudinally along the shaft (in the right-hand direction) and the contact screw 47 can then be adjusted to engage with the disk 45 so that when this point in the travel of the said disk is attained the circuit to the motor will be interrupted.

Similarly, the same operation may be performed in setting the contact screw 46; also, the contact screw 55.

While the mechanism hereinbefore described is shown as operated by an electric motor, other forms of prime mover may be substituted, for example, an air, steam or hydraulic motor, as motor 68, Fig. 4 of the drawings, and in which valves 66 and 67 are utilized to control the supply of fluid for rotating the motor in either direction. These valves are controlled electro-magnetically, as by the corresponding solenoids 85 and 86, to alternately supply the fluid medium to said motor from a supply main 87, said solenoids being in circuit with the corresponding contacts 71 and 77 but no motor starting magnet coil corresponding to coils 70 and 80, Fig. 3, being required.

I claim:

1. A contact controlling device comprising a rotatable shaft, a worm rotatable therewith and slidable thereon, a worm wheel meshing therewith to be driven by the same, resilient means to resist axial movement of said worm, a pair of contact members each including an adjustable element, and a member movable in the axis of said worm and having means at its one end, located between the said pair of contact elements and adapted to engage one or the other of the adjustable elements in accordance with the movement of said worm along its shaft.

2. A contact controlling device comprising a rotatable shaft, a worm rotatable therewith and slidable thereon, a worm wheel meshing therewith to be driven by the same, resilient means to resist axial movement of said worm, a pair of contact elements, a member movable with the worm, located between the said pair of contact elements and adapted to engage one or the other in accordance with the movement of said worm along its shaft, and a secondary contact element beyond one of said pair of contact elements, with a circuit independently closed from a remote point, adapted to bridge the same and to be engaged by the movable member upon further movement of said member in the same direction.

3. A contact controlling device comprising a rotatable shaft, a worm rotatable therewith and slidable thereon, a worm wheel meshing therewith to be driven by the same, resilient means to resist axial movement of said worm, a housing for said worm wheel, worm and shaft, and end housing members closing the first-named housing and having sleeves extending inwardly therein to afford bearings for the said shaft.

4. A contact controlling device comprising a rotatable shaft, a worm rotatable therewith and slidable thereon, a worm wheel meshing therewith to be driven by the same, resilient means to resist axial movement of said worm, a housing for said worm wheel, worm and shaft, end housing members closing the first-named housing and having sleeves extending inwardly therein to afford bearings for the said shaft, means for driving the shaft located in one of the said end housings, and contact means actuated from the said worm and located in the opposite housing.

5. A contact controlling device comprising a rotatable shaft, a worm rotatable therewith and slidable thereon, a worm wheel meshing therewith to be driven by the same, a housing for said worm wheel, worm and shaft, end housing members closing the said housing, having sleeves extending inwardly therein to afford bearings for the said shaft and provided with recessed flanges, helical springs coiled about the bearings for the shaft on opposite sides of the worm to offer resistance to its movement along the shaft, thrust bearings at the respective inner ends of said springs, movably mounted on the corresponding bearings and abutting opposite ends of the worm wheel, the opposite ends of the said springs fitting in the corresponding recessed flanges of the bearings.

6. A contact controlling device comprising a rotatable shaft, a worm rotatable therewith and slidable thereon, a worm wheel meshing therewith to be driven by the same, and the outer end of the shaft being provided with an axial bore extending inwardly to said worm thereon, resilient means to resist axial movement of said worm, a rod fitting said bore, means to secure its inner end to the said worm for limited reciprocation therewith, and contact means adapted to be actuated by the said rod.

7. A contact controlling device comprising a rotatable shaft, a worm rotatable therewith and slidable thereon, a worm wheel meshing therewith to be driven by the same, and the outer end of the shaft being provided with an axial bore extending inwardly to said worm thereon, resilient means to resist axial movement of said worm, a rod fitting said bore, means to secure its inner end to the said worm, the said shaft being slotted to allow for a limited reciprocation of the said contact-making member, and contact means adapted to be actuated by the said rod.

8. A contact controlling device comprising a rotatable shaft, a worm rotatable therewith and slidable thereon, a worm wheel meshing therewith to be driven by the same, and the outer end of the shaft being provided with an axial bore extending inwardly to said worm thereon, a rod fitting said bore, resilient means to resist axial movement of said worm, a bearing for the shaft at opposite sides of the worm, the outer end of said worm being counterbored to fit over the corresponding bearing and the adjacent shaft portion being slotted, a pin passing through said counterbored portion of the worm and slotted portion of the shaft as well as the inner end of the rod to secure the three members together and allow of a limited reciprocation of the said worm and rod relatively to the shaft, and contact means adapted to be actuated by the said rod.

9. A contact controlling device comprising a rotatable shaft, a worm rotatable therewith and slidable thereon, a worm wheel meshing therewith to be driven by the same, resilient means to resist axial movement of said worm, a pair of contact elements, a member movable with the worm adapted to operate one or the other of the contact elements in accordance with the movement of said worm along its shaft, and a secondary contact element beyond one of said pair of contact elements to bridge the same and a circuit to which is adapted to be independently closed from a remote point, the secondary contact element being operable upon further movement of the movable member in the same direction.

In testimony whereof I affix my signature.

PETER PAYNE DEAN.